Dec. 11, 1962 W. G. BARTELS ET AL 3,068,476
REMOTELY CONTROLLED ANTENNA FREQUENCY DETERMINING SYSTEM
Filed Aug. 20, 1959 2 Sheets-Sheet 1
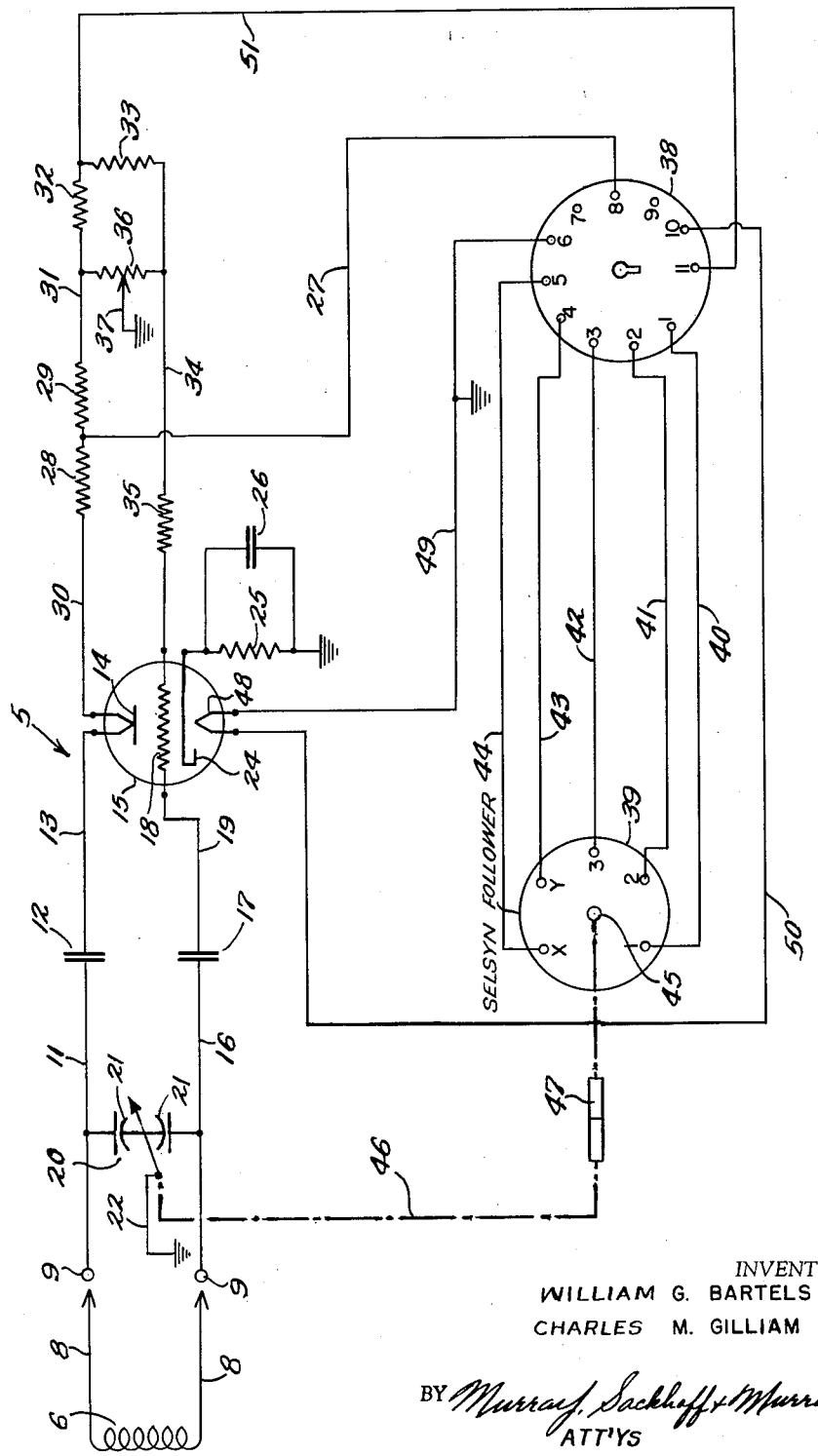
INVENTORS
WILLIAM G. BARTELS
CHARLES M. GILLIAM
BY *Murray, Sackhoff & Murray*
ATT'YS

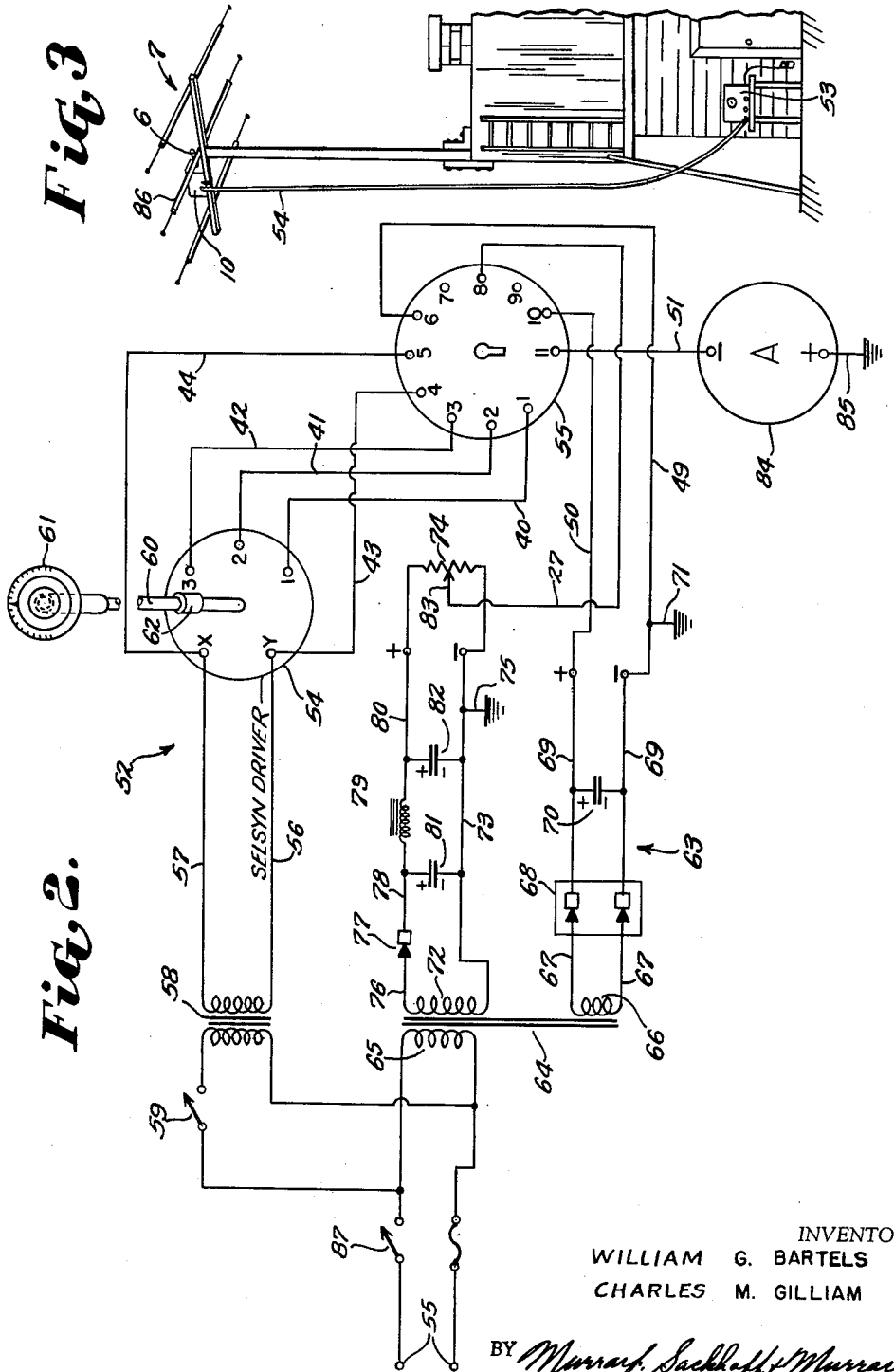

Patented Dec. 11, 1962

3,068,476
REMOTELY CONTROLLED ANTENNA FREQUENCY DETERMINING SYSTEM
William G. Bartels, 5638 Abottsford, Cincinnati 13, Ohio, and Charles M. Gilliam, 945 Summit Ave., Glendale, Ohio
Filed Aug. 20, 1959, Ser. No. 835,138
2 Claims. (Cl. 343—703)

This invention relates to improvements in antenna frequency determining systems and is specifically directed to novel, remotely controlled instrumentalities for obtaining the most efficient operating frequency for an antenna in a particular operating environment.

It is well known that either a transmitter set or a receiver set is most efficient when the antennas therefor are exactly tuned to and therefore in resonance with the operating frequencies of the transmitter or receiver of a communicating station. For many years efforts have been made to secure the desired resonance for antennas but we have found that approximately 95% of the transmitting or receiving antennas presently in use are not on the exact resonant frequency with the signal being transmitted or received, respectively. This condition greatly lowers the transmitting or receiving efficiency of the sets as the case may be. We have found that the characteristics of an antenna are greatly affected by persons and objects in relative proximity to the antenna and that resonant frequency measurements made in the usual manner by a person holding a grid dip meter near the antenna is inaccurate since the capacity effect of the person's body introduces a variable error into the reading obtained by said meter.

It is therefore an object of this invention to provide a remotely controlled, antenna frequency determining instrument which can be read and regulated at a considerable distance from an operatively positioned antenna whose frequency is to be determined.

It is another object of the invention to provide a two-part, remotely controlled antenna frequency determining instrument having a tunable vacuum tube oscillator part removably mounted adjacent an antenna, and a power, regulator and meter part located remotely from the oscillator part, said parts being operatively connected together by a multi-line, flexible cable, or the like.

A further object of the invention is to provide a system for determining the true resonant frequency of an antenna in situ by eliminating the discrepancies and false readings encountered in the use of conventional antenna tuning devices and procedures.

A still further object of the invention is to provide a system for determining the true resonant frequency of an antenna for a predetermined height above the ground which takes into account the interfering capacity effects of surrounding fixed objects whilst excluding the capacity effects of mobile objects and persons.

Still other objects, advantages and improvements will become apparent from the following specification, taken in connection with the accompanying drawings wherein like reference numerals identify like parts throughout the different views:

FIG. 1 is a schematic diagram of the circuit employed in the oscillator part of our antenna frequency determining system.

FIG. 2 is a schematic diagram of the power, regulator and meter part for the antenna frequency determining system which is positioned at a distance from the companion part shown in FIG. 1.

FIG. 3 is a fragmental, perspective view of an exemplary setting for the parts shown in FIGS. 1 and 2.

Referring now in detail to the drawings, and to FIG. 1 in particular, there is shown a tunable, vacuum tube oscillator circuit 5 which includes a plug-in coil 6, the latter being positioned in close proximity and preferably at right angles to an element of an antenna 7 (FIG. 3) whose frequency is to be determined. This plug-in coil has leads 8—8 which are intended to be plugged into exposed input terminals 9—9 mounted on a panel of an electrically insulated box 10 for enclosing the tunable oscillator parts. One of said input terminals is connected by a conductor 11 to a blocking capacitor 12 and the latter is in turn connected by a conductor 13 to the plate 14 of an electron tube 15. The other input terminal of the coil 6 is connected by a conductor 16 to a blocking capacitor 17, said capacitor being connected to the control grid 18 of the electron tube 15 by a conductor 19. A split stator, variable capacitor 20 is shunted across the conductors 11 and 16, the rotors 21—21 being coupled for unitary movement and connected to ground by a suitable conductor 22. The electron tube circuit and the coil 6 form an oscillating tunable circuit that is adjustable through resonance with the antenna element whose frequency is to be determined.

The cathode 24 of the electron tube is connected to ground through a series resistor 25 shunted by a capacitor 26 whilst the power supply for the plate 14 is secured through a line 27 that is connected to the juncture of two series resistors 28 and 29, resistor 28 being connected to the plate by a conductor 30. The other series resistor 29 is connected by a conductor 31 of two series resistors 32 and 33, the said resistors being connected to the grid 18 of the tube 15 by a line 34 that has a resistor 35 interposed therein. A potentiometer 36 is shunted across the conductors 31 and 34, the movable arm therefor being grounded by a connector 37.

The numeral 38 indicates diagrammatically a multi-socket plug that is mounted on a panel of box 10, it being noted that terminals marked "1," "2" and "3" are connected to correspondingly numbered control terminals of a conventional, self synchronous, induction type follower motor 39, known as a "Selsyn" motor, by conductors 40, 41 and 42, respectively, whilst plug terminals marked "4" and "5" are connected to power input taps marked "Y" and "X," respectively, of the motor by power lines 43 and 44, respectively. The driven shaft 45 of the "Selsyn" motor 39 has a suitable drive connection with the stators 21—21 of the variable capacitor 20, said drive connection being indicated in FIG. 1 by the dashed line 46. Said drive connection has a suitable electric insulating coupling 47 therein. The electron tube 15 is provided with a heater element 48 that has two supply lines 49 and 50, respectively connected to plug terminals marked "6" and "10," it also being noted with reference to FIG. 1 that the plate power line 27 is connected to plug terminal marked "8," whilst the plug terminal marked "11" is connected to the junction of the two series resistors 32 and 33 of the oscillator circuit by a line 51.

Now with respect to FIG. 2 there is shown diagrammatically a companion part 52 to our tunable oscillator part 5, this companion part being housed in a suitable box 53 (FIG. 3) which is located at a distance from the box 10 and preferably connected and remotely controlled by an insulated flexible cable 54 carrying a plurality of electric lines that are embedded in and insulated from each other within the cable. In FIG. 2 the numeral 55 indicates a multi-socket plug suitably mounted on a panel of the box 53 and having a plurality of marked terminals corresponding by number to the numbered terminals of the multi-socket plug 38 for the box 10, it being understood that the reference numerals employed in FIG. 1 to identify the conductors connected to the terminals of plug 38 identify corresponding conductors that are connected to the terminals of plug 55 in FIG. 2 of the drawings. In FIG. 2 there are generally shown diagrammatically the power, regulator and meter elements for our instrument and in this respect it will be noted that the power lines 43 and 44 for the "Selsyn" motor 39 are also connected to the power taps "Y" and "X," respectively, of the usual self-synchronous or "Selsyn" driver motor 54, and that said lines are connected to a source of alternating current 55 by lines 56 and 57, respectively, that have a step down transformer 58 interposed therein, line 57 having a switch 59 therein.

The "Selsyn" driver motor 54 has a rotor (not shown) to which is connected a shaft 60 that has a vernier dial 61 fixed to its outer end and in insulated coupling 62 intermediate its length. The synchronizing rotor circuit for the follower and driver motors is indicated by the terminals marked "1," "2" and "3" and the corresponding conductors 40, 41 and 42 and it will be understood that by utilizing the vernier dial 61 the rotor of the "Selsyn" driver motor may be manually set to a precise degree of rotary adjustment and that the displacement of said rotor will be transmitted at a distance to the driven shaft 45 of the "Selsyn" follower motor 39 which in turn is connected to the rotors 21—21 of the split stator capacitor 20 by drive connection 46 to thus regulate the follower and finely tune the oscillator circuit 5.

The power means for the heater element 48 of the tube 15 and the oscillator circuit 5 is indicated generally by the reference numeral 63, said means being adapted to change alternating current into direct current and comprising a transformer 64 having its primary winding 65 connected to the source of power 55. The supply circuit 49—50 of the heater element 48 is secured from a secondary winding 66 of the transformer 64 that is connected by conductors 67—67 to a full wave selenium rectifier 68. The other side of said rectifier is connected by conductors 69—69 to the positive and negative terminals to which conductors 50 and 49, respectively, are connected, capacitor 70 being shunted across the conductors 69—69 and also the terminal with negative potential grounded at 71.

The plate supply of the electron tube 15 is obtained from a secondary winding 72 of transformer 64, one side of said winding being connected by a conductor 73 to one side of a potentiometer 74. The conductor 73 is at negative potential and has a ground connection thereon at 75. The other side of the secondary winding 72 is connected by a conductor 76 with a half-wave selenium rectifier 77 which in turn is connected by a conductor 78 to a choke coil 79, the choke coil being connected by a conductor 80 at positive potential to the other side of the potentiometer 74. Capacitors 81 and 82 are shunted across conductors 78—73 and 80—73, respectively, and form a filter unit with the choke coil 79. The movable arm 83 of the potentiometer is connected to the line 27 which supplies direct current to the oscillator circuit 5.

An ammeter 84 is preferably mounted on the box 53 containing the circuit shown diagrammatically in FIG. 2 and this meter is preferably a milliampere meter having a negative terminal connected to the line 51 which in turn is connected to the juncture of the two series resistors 32 and 33 of the tunable oscillator circuit 5. The positive terminal of the ammeter 84 is connected to ground by conductor 85.

It will therefore be understood that the tunable electronic oscillator circuit is a unit adapted for placement adjacent an operatively positioned antenna and that the tuning controls therefore and the indicating meter of the circuit is a unit located at a remote place with respect to the said antenna, a means such as a flexible cable extending between and operatively interconnecting the units for determining the exact resonant frequency of the antenna.

When it is desired to determine the frequency of an antenna in situ such as the laterally extensible, driven element 86 (FIG. 3) the box 10 is temporarily mounted on an antenna member in position such that the plug-in coil 6 projecting from said box is adjacent to and preferably at right angles with the said element 86. This may be accomplished by taking the antenna down from its operative position, securing the said box 10 thereto, and returning the antenna to operative position, or by climbing the antenna and securing the box thereto. The box may be positioned in other ways depending upon the particular operative position of the antenna. When the box 10 is in position the companion box 53 containing the power, regulator and meter devices is positioned at a distance from the operative antenna position, such as on the ground as shown in FIG. 3, or at some other remote position, the boxes being preferably and remotely connected by the insulated, flexible cable 54 which carries the various conductor wires that operatively connect the two parts of our system together.

Next a master switch 87 is closed connecting the alternating source of power 55 to the power means 63 which in turn energizes the oscillating circuit through line 27 and heats the tube 15 through supply lines 49 and 50. Next the switch 59 is closed to energize the "Selsyn" power means whereafter the vernier dial 61 may be rotated and its degree of rotation transmitted to move the rotors 21—21 of the split stator, variable capacitor 20. The vernier is rotated until the oscillator is tuned through resonance with the driven element 86 of the antenna, the exact tuning of the circuit being indicated by a sharp drop in potential in the grid circuit which will be recorded as the lowest reading on the dial of ammeter 84. The reason attributed for this is that the frequency of the driven element 86 will absorb energy from the oscillator circuit 5 when both are tuned to the same frequency, the loss of energy from the oscillator circuit causing the feed back to decrease and this in turn is accompanied by a decrease in grid current. At this time resonant frequency is attained and can be detected by a conventional receiver. It therefore will be understood that the frequency of the driven element 86 of antenna 7 may be accurately determined at a distance remote from the antenna without interference from the bodies of persons or other mobile objects connected with the process of tuning the antenna. Thus exact resonance for the antenna can be secured and the desired operating frequency of the antenna obtained by the manual adjustment of the element 86.

What is claimed is:

1. In a system for determining the frequency of an antenna element in situ the combination of a portable unit comprising a tunable electronic oscillator circuit including a plug-in coil adapted for placement in close proximity to the antenna element, and a self synchronous follower motor for tuning said circuit to resonance with the antenna element, a remote unit comprising a manually operable self synchronous driver motor, a cable extending between the said units, an electric circuit including conductors embedded in the cable and connecting the follower and driver motors, a power means in the remote unit for energizing the said circuit, and an ammeter having its terminals connected to the oscillator circuit by conductors embedded in the cable for recording the resonant frequency of the oscillator circuit.

2. In a system for determining the frequency of an antenna element in situ the combination of a portable unit having a tunable oscillator circuit including an electronic tube and a plug-in coil adapted for placement in close proximity to the antenna element, and a self synchronous follower motor for tuning said circuit to resonance with the antenna element, a remote unit comprising a manually operable, self synchronous driver motor, a cable extending between the said units, an electric circuit for the motors including conductors embedded in the cable, an electric power means with the said unit, means connecting the electric circuit for the motors with the power means, a heater circuit for the electronic tube having conductors in the cable, means connecting the heater circuit to the power means, cable embedded conductors connecting the oscillator circuit to the power means, and an ammeter adjacent the remote unit and having terminals connected to the oscillator circuit by conductors embedded in the cable for recording the resonant frequency of the oscillator circuit.

References Cited in the file of this patent

UNITED STATES PATENTS

| | | |
|---|---|---|
| 2,197,494 | Erben | Apr. 16, 1940 |
| 2,321,699 | O'Brien | June 15, 1943 |
| 2,334,279 | Neiman | Nov. 16, 1943 |
| 2,480,829 | Barrow et al. | Sept. 6, 1949 |
| 2,583,747 | Potter | Jan. 29, 1952 |

OTHER REFERENCES

The Radio Amateurs Handbook, 1949 (26th edition), published by Radio Relay League, West Hartford, Conn., pp. 480–482.

The Radio Amateurs Handbook, 1954 (31st edition) as above, pp. 469–70.

Servo-Mechanism Practice, Ahrendt, published by McGraw-Hill Co., New York, 1954, pp. 38–39.